United States Patent [19]

Kenny et al.

[11] Patent Number: 4,950,965
[45] Date of Patent: Aug. 21, 1990

[54] THROTTLE CONTROL SERVOACTUATOR

[75] Inventors: Andrew A. Kenny, Roselle, Ill.; Loren H. Uthoff, Canton; Donald R. Haefner, Oak Park, both of Mich.

[73] Assignee: Eaton Corporation, Cleveland, Ohio

[21] Appl. No.: 431,812

[22] Filed: Nov. 6, 1989

[51] Int. Cl.$^5$ .................... B60K 28/16; B60K 31/00; F02D 9/08
[52] U.S. Cl. .................... 318/560; 318/663; 123/342; 123/352; 123/400; 180/197
[58] Field of Search .................... 318/560, 652, 663; 123/198 D, 342, 349, 352, 359, 361, 377, 396, 399, 400; 180/178, 179, 197; 74/522

[56] References Cited

U.S. PATENT DOCUMENTS

| Re. 32,413 | 5/1987 | Hayashida | 123/342 |
|---|---|---|---|
| 1,582,239 | 4/1926 | Barbarou | |
| 4,346,776 | 8/1982 | Taplin | 180/179 |
| 4,362,138 | 12/1982 | Krueger et al. | 123/342 |
| 4,380,799 | 4/1983 | Allard et al. | 364/426 |
| 4,397,276 | 8/1983 | Hayashida | 123/342 |
| 4,543,932 | 10/1985 | Sturdy | 123/342 |
| 4,559,912 | 12/1985 | Larom et al. | 123/350 |
| 4,703,823 | 11/1987 | Yogo et al. | 123/399 X |
| 4,714,864 | 12/1987 | Yogo et al. | 123/349 X |
| 4,747,380 | 5/1988 | Ejiri et al. | 123/399 |
| 4,750,582 | 6/1988 | Maas | 180/197 |
| 4,756,287 | 7/1988 | Sakakibara et al. | 123/342 |
| 4,795,000 | 1/1989 | Ocvirk et al. | 180/176 |
| 4,811,809 | 3/1989 | Reinartz et al. | 180/197 |
| 4,838,225 | 6/1989 | Steffes | 123/342 |
| 4,856,476 | 8/1989 | Shirakawa | 123/399 X |
| 4,856,477 | 8/1989 | Hanaoka et al. | 123/361 X |
| 4,858,715 | 8/1989 | Tominaga | 180/197 X |

FOREIGN PATENT DOCUMENTS

| 59-5844 | 1/1984 | Japan. | |
| 59-79050 | 5/1984 | Japan. | |
| 59-122742 | 7/1984 | Japan | 123/399 |

Primary Examiner—Bentsu Ro
Attorney, Agent, or Firm—R. A. Johnston

[57] ABSTRACT

A servoactuator for a vehicle throttle having a direct current motor driving a speed reducer with the output thereof connected to slidably move a fulcrum member having a lever arm pivoted thereon. The lever arm has a cable to the engine throttle connected to one end and a cable to the vehicle accelerator pedal connected to the other end on the opposite side of the pivot. In one embodiment the speed reducer drives an axial lead screw threaded in the fulcrum member. In a second embodiment the speed reducer output is a slotted crank arm having a pin on the fulcrum member slidably received therein. In a third embodiment the speed reducer output is connected by a two-bar linkage to the fulcrum member. A potentiometer is disposed to have the movable element thereof moved by one end of the lever to provide a throttle position feedback signal for use by an external motor control signal generator. The servoactuator is intended for use with a vehicle traction control system.

15 Claims, 3 Drawing Sheets

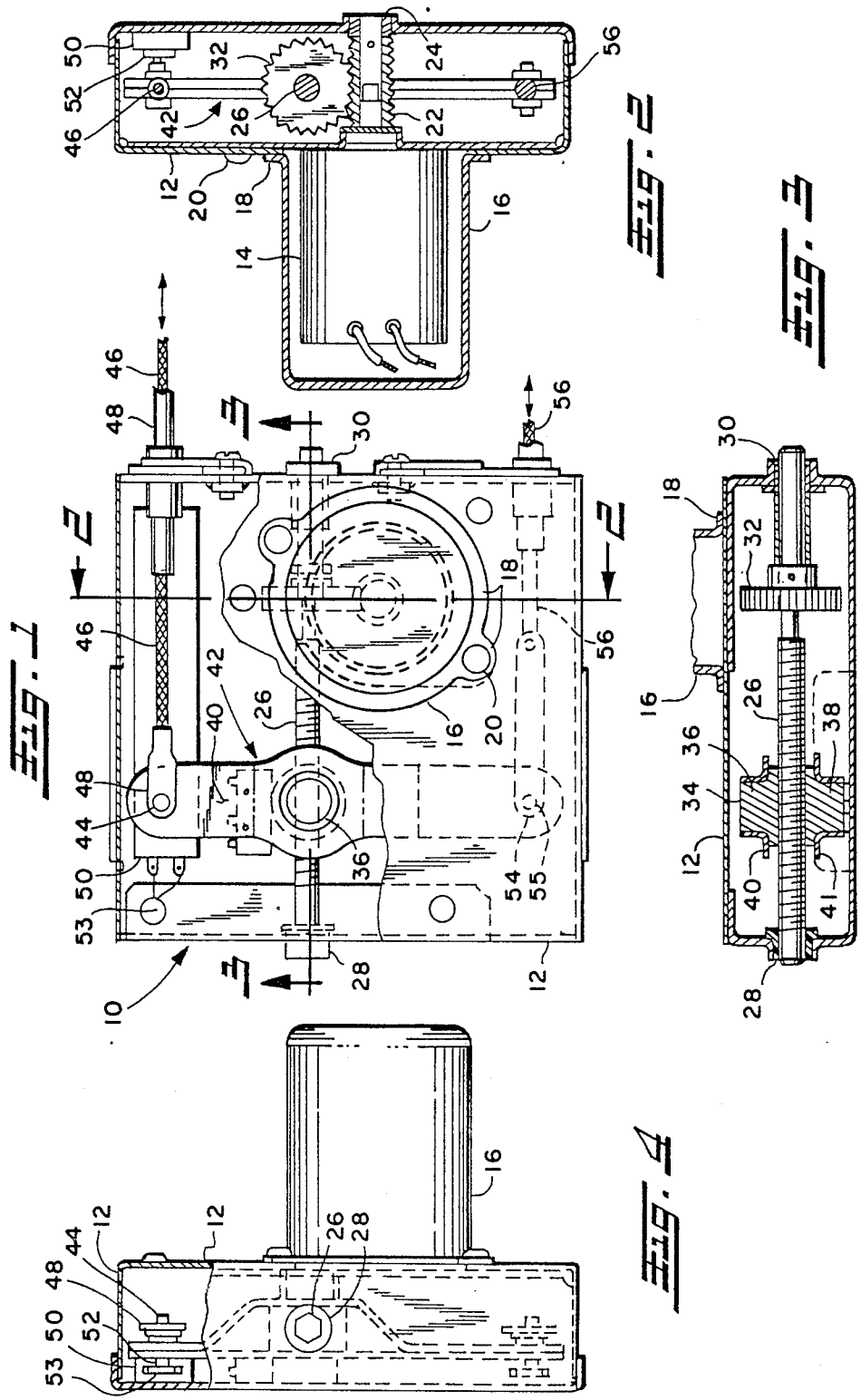

THROTTLE CONTROL SERVOACTUATOR

BACKGROUND OF THE INVENTION

The present invention relates to devices for intervening in the actuation of a vehicle throttle actuated by a driver controlled accelerator pedal typically connected to the throttle by a pivoted linkage including a tension cable. Under certain circumstances, as for example, sudden loss of wheel traction, it has been desired to provide an automatic way or means of intervening in the throttle actuation to prevent the driver from maintaining or increasing the throttle opening and to provide such intervention at a speed or rate greater than that of the physical reaction of the driver to the sudden loss of traction, for example upon encountering snow or ice on the roadway.

In particular, it has been desired to provide throttle cable intervention in connection with the operation of vehicles equipped with anti-lock braking systems (ABS) which prevent wheel lockup upon application of the service brakes for stopping the vehicle. Vehicles equipped with ABS systems provide improved safety of operation by minimizing the risks of skidding and, therefore, enable the vehicle to stop in the minimum distance in the event of an emergency situation. ABS systems are, thus, a desirable feature and give the driver a sense of improved control of the vehicle. Where the driver is aware that the vehicle is equipped with ABS, it has also been found desirable to provide a traction control system which prevents traction wheel slippage in the power-on mode under conditions of vehicle operation on slippery road surfaces In order to provide traction control capable of responding to sudden loss of wheel traction at a rate faster than the driver can physically react, it has been necessary to provide electrical actuators for the engine throttle which can respond to a control signal generated in response to electrical signals from wheel slip sensors. However, there has been some reluctance in providing an all electric throttle actuation system for normal vehicle operation; and, it has been desired to retain the usual mechanical throttle tension cable linkage between the vehicle accelerator and the engine throttle. Therefore, it has been desired to provide an electrically operated throttle cable intervention device which can override the throttle actuation by the driver in the event of sudden loss of wheel traction but otherwise operates in the conventional mode with mechanical linkages or cables from the vehicle accelerator.

The problem has thus been to find a simple reliable and inexpensive servoactuator for throttle cable intervention to provide for changing the length of the throttle tension cable automatically by electrical operation of the servoactuator at a rate faster than the driver's physical reaction; and, to otherwise maintain normal mechanical throttle operation by the vehicle accelerator pedal when there is no loss of wheel traction.

SUMMARY OF THE INVENTION

The present invention provides an electrically operated low-voltage direct current servoactuator for interrupting a vehicle engine throttle cable as a tension link and is electrically operated for changing the length of the tension link in the throttle cable. The servoactuator of the present invention is operated electrically by an externally supplied control signal which drives a motor speed reducer to move a slidably mounted fulcrum member for altering the location of the pivot point of a lever arm pivotably mounted on the fulcrum member to change the length of the tension link between the accelerator pedal and the engine throttle responsive to an electrical control signal which may be derived from wheel speed sensors.

The servoactuator of the present invention employs a DC motor driving a speed reducer and through an interconnecting linkage means, a fulcrum member slidably mounted on the housing. The fulcrum member has pivoted thereon a lever arm which has its ends on opposite sides of the pivot connected one respectively to the tension cable to the engine throttle and the other to the tension cable to the vehicle accelerator pedal. When the motor is inoperative, normal mechanical interconnection between the accelerator pedal and the engine throttle is maintained.

The motor is operative upon receipt of an electrical control signal from a signal generator in response to loss of wheel traction to move the fulcrum member to prevent further opening of the throttle or decrease of the throttle opening as required to maintain traction despite driver movement of the accelerator pedal in an attempt to maintain or increase the engine throttle opening.

Movement of the end of the lever arm connected to the engine throttle cable is sensed by a potentiometer having the movable element thereof connected to the end of the lever arm to provide a throttle position feedback signal.

In one embodiment, the speed reducing means has an output gear with an arm extending therefrom and pinned thereto, which has a slot therein slidably engaging a pin provided in the fulcrum member for effecting sliding movement thereof.

A second embodiment has a speed reducing output means effective for rotating an axial lead screw which threadedly engages the fulcrum member to provide movement thereof.

A third embodiment employs a two-bar linkage interconnecting the output of the speed reducing means and the sliding fulcrum member on the housing. The potentiometer wiper is attached to one of the two bar members to provide the throttle position feedback signal.

The present invention thus provides a unique and novel servoactuator employing a direct current motor and speed reducer interconnected for slidably moving a fulcrum member on the servoactuator housing with a lever arm pivoted on the fulcrum member and the engine throttle cable attached to one end of the lever arm with the accelerator pedal cable attached to the end of the arm on the opposite side of the pivot. The motor is operative through the speed reducing means upon receipt of an external control signal to move the fulcrum member for effectively lengthening the linkage between the accelerator pedal and the throttle for effecting movement of the throttle in a closing direction or restricting further opening of the throttle for traction control purposes. A potentiometer mounted on the housing has its movable member or wiper connected to the lever arm or the interconnection between the speed reducing means and the fulcrum member for providing a throttle position feedback signal for use in creating the motor control signal.

BRIEF DESCRIPTION OF THE DRAWINGS

FIG. 1 is a side view with portions of the cover broken away of one embodiment of the servoactuator of the present invention;

FIG. 2 is a section view taken along section-indicating lines 2—2 of FIG. 1;

FIG. 3 is a section-indicating lines 3—3 of FIG. 1;

FIG. 4 is an end view of the embodiment of FIG. 1;

DETAILED DESCRIPTION

Figure 5:
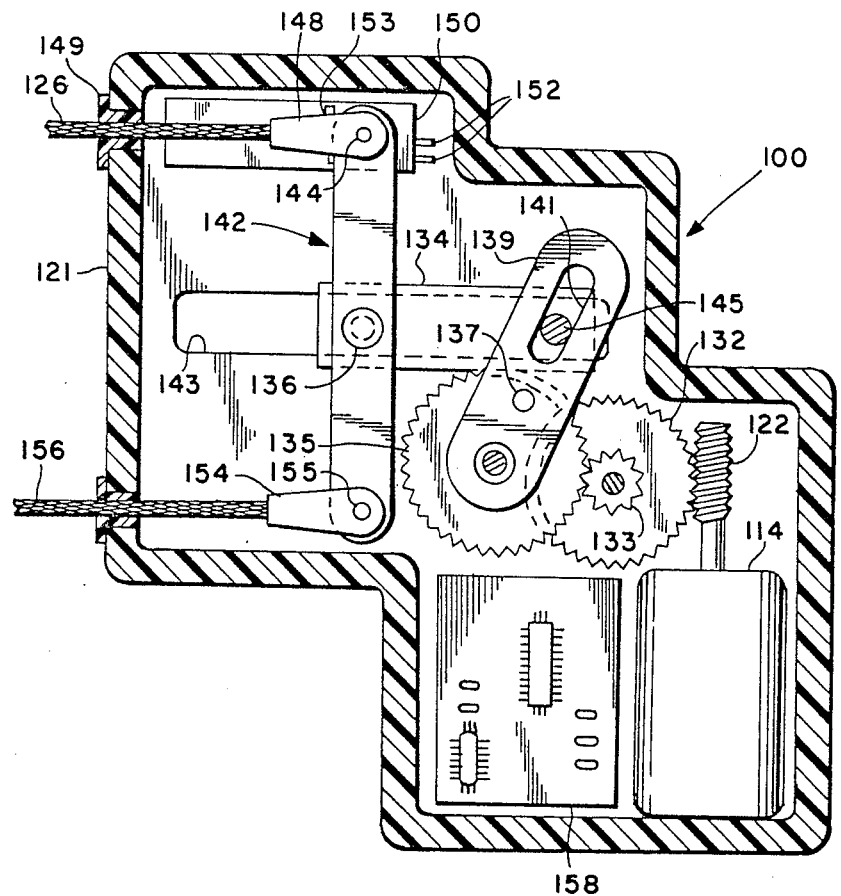
FIG. 5 is a cross-section of another embodiment of the invention.

Referring now to FIG. 1, the invention is shown embodied in a servoactuator assembly indicated generally at 10 with a housing 12 adapted for installation in the engine compartment of a vehicle. A direct current electric motor 14 (FIG. 2) is attached to the front face of housing 12 and encased by suitable cover 16 which is attached to the front face of the housing 12 by flange 18 and suitable fasteners 20. Motor 14 has a worm 22 provided on its output shaft and which extends interiorly of the housing 12 and preferably has the end thereof journalled for rotation in the remote side of the housing for structural location thereof by a suitable bearing denoted by reference numeral 24 in FIG. 2.

An axial lead screw 26 is received in the housing 12 and has one end thereof journalled in a suitable bearing 28 provided in the left end face of the housing in FIGS. 1 and 2 with the opposite end of lead screw 26 journalled in the right face of the housing in bearing 30. A worm gear 32 is provided on the lead screw 26 and engages the worm 22 to rotate the lead screw 26 in response to energization of the motor 14. A fulcrum member 34 has internal threads provided thereon corresponding to the threads of the axial lead screw 26, and the fulcrum member is threadedly received on the lead screw 26 intermediate the worm gear 32 and bearing 28.

Fulcrum member 34 has pivot bearing surfaces 36,38 provided on opposite sides of the lead screw, and each of the bearing surfaces, 36,38 has journalled thereon a stamped side plate 40,41 which plates together form a lever arm indicated generally at 42 which is pivoted on fulcrum 34 about an axis generally at right angles to the axis of lead screw 26.

Lever arm 42 has at the upper end thereof and attached thereto by a suitable clevis denoted by reference numeral 48 in FIGS. 1 and 4, secured by a pin 44 which connects to the upper end of the lever arm 42 one end of a tension cable 46 which is adapted for connection to a vehicle throttle (not shown). Cable 46 extends exteriorly through the righthand end face of the housing 12 through a cable jacket 48 in which it is received and guided for free-sliding movement therein.

Referring to FIGS. 1 and 4, a linear potentiometer 50 is disposed within the housing 12 and has a movable element indicated by reference numeral 52 in FIG. 4 connected to the pin 44 for movement therewith to provide a variable resistance in response to movement of the pin 44 and thus provides a throttle position feedback signal. Electrical connector terminals 53 are provided on the end of the potentiometer for external electrical attachment thereto.

The opposite end of lever 42 from clevis pin 44 has the second clevis 54 attached thereto by suitable pin connection 55, and the clevis 54 is attached to a second jacket at tension cable 56 which is adapted for connection to the vehicle accelerator pedal (not shown).

In operation, without energization of the motor 14, the fulcrum member 34 remains stationary on lead screw 26, and the bearings 36,38 remain stationary for providing a fixed location pivot for the lever 42, thereby providing a fixed length mechanical linkage between the vehicle accelerator pedal and the engine throttle.

Upon energization of the motor 14 and rotation of the lead screw 26 in response to a desired electrical signal provided by a suitable controller (not shown) the fulcrum member 34 is moved in a rightward direction with respect to FIGS. 1 and 3 for effectively lengthening the cable connection between the accelerator pedal and the engine throttle such that increased depression or constant depression of the accelerator pedal by the driver is not effective to further open the throttle. Irrespective of the accelerator pedal position the throttle is moved in a direction to reduce engine speed for traction control purposes. It will be understood that the details of the electrical circuitry and control strategy employed for generating the control signal form no part of the present invention other than the control signal must be able to provide the desired rotation of the motor 14. It will be understood that the circuitry for generating the control signal (not shown) also receives an input signal from the potentiometer 50 as a throttle position feedback for use in modifying or attenuating the control signal.

Referring to FIG. 5, a second embodiment of the invention is illustrated generally at 100 and has a housing 121 having a motor 114 mounted therein with a worm 122 on the output shaft thereof. The worm 122 engages a worm gear 132 which has a pinion 133 provided thereon for driving output to a second gear 132. Pinion 133 engages an output gear 135 which has secured thereto by a pin 137 a driving arm 139 having an elongated slot 141 provided therein.

A fulcrum member 134 is mounted for sliding movement in slot 143 provided in the housing 121 and the fulcrum member 134 has attached thereto a pin 145 which extends into the slot 145 in free-sliding engagement.

A lever arm 142 is pivoted on fulcrum 134 by a suitable pinned connection 136. Arm 142 has at one end thereof attached thereto in pivoted engagement a clevis 148 secured by pin 144. Clevis 148 is attached to a tension cable 146 which extends through a bushing 149 provided in the wall of the housing 121 for free-sliding movement therethrough and the cable is adapted for connection to a vehicle engine throttle.

The opposite end of lever 142 has attached thereto and disposed on the opposite side of pivot 136, a second clevis 154 secured to the lever arm 142 by pinned connection 155. Clevis 154 has attached thereto a tension cable 156 which extends through an opening in housing 121 in free-sliding arrangement and is adapted for connection to a vehicle accelerator pedal.

A potentiometer 150 is disposed within the housing 121 and has electrical connectors 152 provided thereon and adapted for external connection thereto, the potentiometer having a movable element 153 which is moved by connection to the clevis pin 144. The potentiometer 150 thus serves to provide a throttle position signal which is used for generating the control signal for motor 114. If desired, the electronic circuit board for portions of the control signal generating function, as for example, an amplifier circuit for the motor-driver signal function may be provided within housing 121 as indicated by reference numeral 158.

In operation, energization of motor 114 causes output gear 135 to rotate arm 139. The sliding contact of slot 141 with pin 145 move the fulcrum member 134 along slot 143 to reposition the pivot 136 for the lever arm 142 thereby changing the effective length of the connection of tension cables 126 and 156 between a vehicle accelerator pedal and engine throttle for effecting throttle position. As mentioned hereinabove with respect to the embodiment of FIG. 1, such throttle intervention or change of effective length of the linkage between the accelerator pedal and the engine throttle may be accomplished for moving the engine throttle in a direction toward closing, or preventing further opening of the throttle despite movement of the accelerator pedal, for purposes of preventing loss of vehicle traction.

Figure 6:
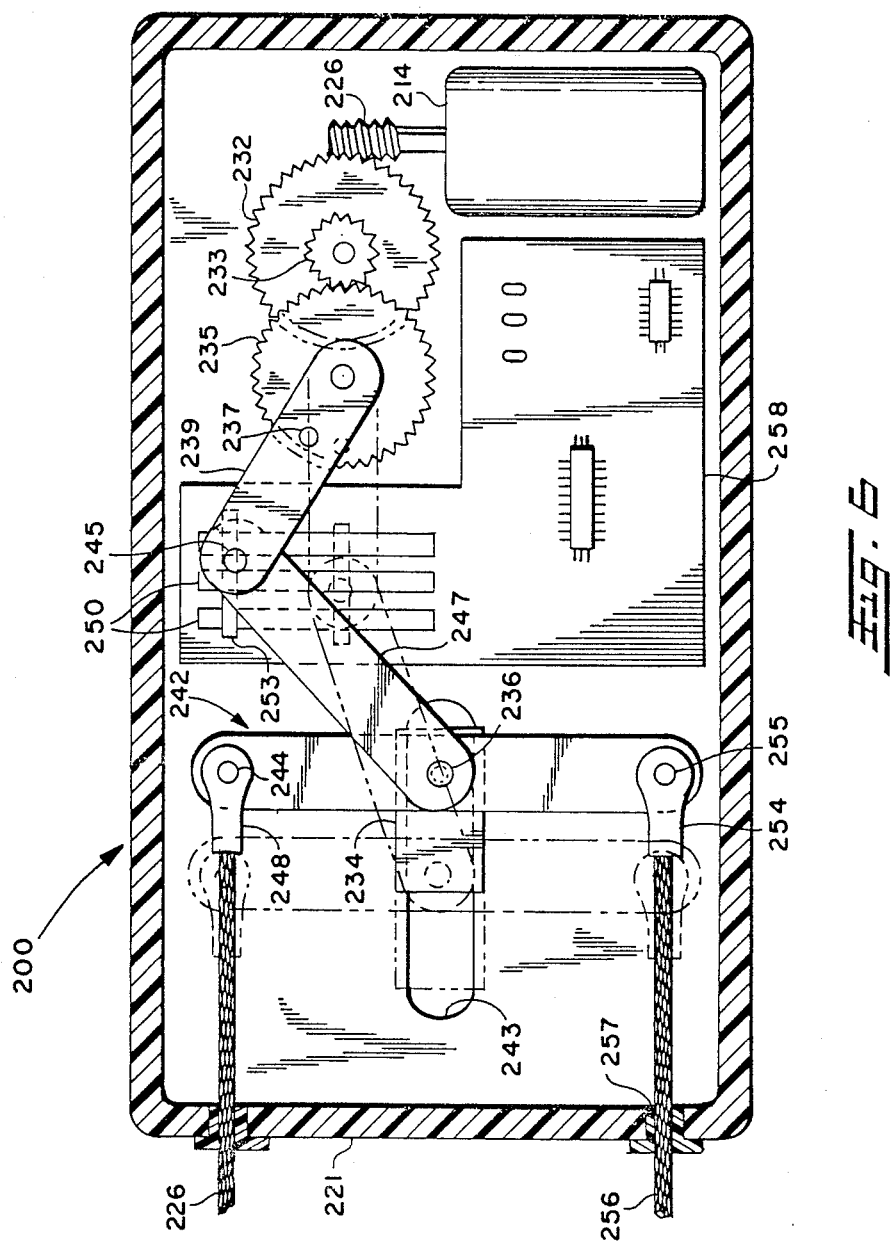
FIG. 6 is a cross-section of a third embodiment of the invention.

Referring to FIG. 6, a third embodiment of the invention is illustrated in the form of a servoactuator indicated generally at 200 and has housing 221 with a direct current motor 214 mounted therein having a worm 226 provided on the output end of the motor shaft. The worm 226 engages a driven worm gear 232 journalled on the housing and having attached thereto an output pinion 233 which drivingly engages an output gear 235 also journalled for rotation on the housing 221. Output gear 235 has attached thereto an arm 239 secured to the gear by pin 237 for rotation therewith, the arm 239 having the free end thereof pivotally connected to a bar link 247 by pivot pin 245.

A fulcrum member 234 is slidably mounted in slot 243 formed in the housing 221 and the free end of bar link 247 is pivotally connected to the fulcrum member 234 by a pin connection 236. The arm 239 and bar link 247 thus provide a two-bar linkage connection between the output gear 235 of the speed reducer and a fulcrum member 234 for effecting sliding movement of the fulcrum member in response to rotation of gear 235.

An elongated lever indicated generally at 242 is pivotally attached to the fulcrum 234 by pinned connection 236 which also has the free end of link bar 247 pivotally attached thereto. One end of the lever 242 has a tension cable 226 connected thereto by a clevis 248 secured at pinned connection 244 and the cable 226 extends outwardly through bushing 245 provided in the housing in free-sliding arrangement.

The end of the lever 242 on the opposite side of pivot 236 has attached thereto a second clevis 254 secured to the lever by pinned connection 255; and, clevis 254 has attached thereto a tension cable 256 which extends outwardly through bushing 257 provided in the housing 221 in free-sliding arrangement. The upper tension cable 226 in FIG. 6 is adapted for attachment to a vehicle engine throttle; and, the lower tension cable 256 in FIG. 6 is adapted for attachment to a vehicle accelerator pedal such that motion of cable 256 pivots lever 242 and causes motion of the cable 226 in the opposite direction.

A potentiometer is provided of the housing in the form of a plurality of resistive strips 250 disposed in spaced parallel arrangement. If convenient, the strips 250 may be mounted on a printed circuit board 258 provided for the motor driver amplifier circuitry. A movable element 253 is attached to the pivot pin 245 for movement therewith for wiping contact along strips 250 to provide a variable resistance for providing a position signal for indicating the position of the two-bar link. In FIG. 6 the extended position of the two-bar link and fulcrum 234 is indicated in dashed outline in which position the servoactuator 200 is operative to permit the vehicle engine throttle to fully close. The position of the two-bar link shown in solid outline in FIG. 6 represents the extreme rightward position of movement of the fulcrum member 234.

The present invention thus provides a unique and novel servoactuator for providing throttle cable intervention in a vehicle between the accelerator pedal and the engine throttle and is particularly suited for use in throttle intervention employed for traction control purposes. The servoactuator of the present invention employs a DC motor acting through a speed reducing gear train and intermediate linkages to move a fulcrum member slidably mounted on the servoactuator housing. A lever arm is pivoted on the fulcrum member with the engine throttle cable and the accelerator pedal cable attached to opposite ends of the lever arm such that movement of the fulcrum member and the lever arm pivot changes the effective length of the linkage between the accelerator pedal and the engine throttle. In one embodiment, the fulcrum member is mounted on an axial lead screw driven by the gear train and in a second embodiment a pin on the fulcrum member is slidably engaged in a slot provided in an arm attached to the output gear of the speed reducer. In a third embodiment, the output gear of the speed reducer is connected by a two-bar linkage to the slidable fulcrum member. In the first and second embodiments, a potentiometer is mounted on the housing with the movable element thereof moved by the point of connection of the lever arm with the engine throttle cable. In the third embodiment the potentiometer is mounted to the housing with a movable element thereof attached to the pivot length in the two-bar linkage.

The present invention thus provides a unique and novel servoactuator for engine throttle intervention which is compact and capable of being readily installed in the vehicle engine compartment with a minimum of disruption of the cable connections between the accelerator pedal and the engine throttle.

Although the invention has hereinabove been described with respect to the illustrated embodiments, it will be understood that the invention is capable of modification and variation and is limited only by the following claims.

We claim:
1. A servoactuator for a vehicle throttle comprising:
  (a) housing means;
  (b) a fulcrum member movably disposed on said housing means and guided thereon for movement in along a predetermined line of action;
  (c) lever means pivotally mounted on said fulcrum member, said lever means adapted for receiving and transmitting throttle action, and reaction forces, thereto on opposite sides of said pivot pivotal mount and in the direction of said line of action;
  (d) electric actuator means mounted on said housing means and responsive to an electrical control signal to provide rotation of an output member:
  (e) linkage means operatively connecting said output member for effecting said movement of said fulcrum member; and,
  (f) fulcrum position feedback means disposed on said housing means and operative to sense movement of said linkage means and provide an electrical indica- tion thereof for use in generating said control signal.

2. The servoactuator defined in claim 1, wherein said linkage means comprises a two-bar link.

3. The servoactuator defined in claim 1 wherein said linkage means includes a first bar member extending from said output member and rotatable therewith, and a second bar member pivotally connected to said first bar member and said fulcrum member.

4. The servoactuator defined in claim 1, wherein said feedback means includes an electrical contact member mounted on said linkage means and at least one resistive member disposed on said housing means for movable electrical contact with said movable contact member.

5. The servoactuator defined in claim 1, wherein said feedback means includes an electrical contact wiper on said linkage means and a plurality of spaced resistive strips disposed on said housing means for contact by said wiper.

6. The servoactuator defined in claim 1, wherein said feedback means includes an electrical contact wiper disposed on said linkage means for movement in a direction generally at right angles to said line of action and an electrical resistive member disposed on said housing means for contact by said wiper.

7. The servoactuator defined in claim 1, further comprising throttle position sensing means operative to sense the pivoted motion of said lever means with respect to said fulcrum member and provide an electrical signal indicative thereof.

8. A throttle intervention servoactuator comprising:
   (a) housing means;
   (b) fulcrum means disposed on said housing means and guided thereon for movement in a predetermined direction;
   (c) lever means pivotally mounted on said fulcrum means, said lever means including a first throttle link connected on one side of said pivotal mount for throttle force input and a second throttle link connected on the opposite side of said pivotal mount for output in a direction generally parallel to said predetermined direction;
   (d) motor means disposed on said housing means and operative upon receipt of an electrical control signal to provide bi-directional rotation of a shaft;
   (e) speed reducer means operatively coupled to receive power from said shaft including an output member rotatable in response to rotation of said shaft, said output member having a surface portion thereof slidably connected to effect movement of said fulcrum means in said predetermined direction.

9. The throttle servoactuator defined in claim 8, wherein, said speed reducer means output member comprises an arm and said surface portion comprises a slot in said arm; and, said slot engages a projection on said fulcrum means.

10. The throttle servoactuator defined in claim 8, further comprising position feedback means disposed on said housing means and operable to sense movement of said second throttle link and to provide an electrical indication of said movement.

11. The throttle servoactuator defined in claim 8, wherein said speed reducer means output member comprises an axial lead screw threadedly engaging said fulcrum means.

12. The throttle servoactuator defined in claim 8, further comprising a potentiometer disposed on said housing means operable for sensing movement of said second throttle link and to provide a change in resistance indicative thereof.

13. A throttle intervention servoactuator comprising:
   (a) housing means;
   (b) motor means mounted on said housing means and having an output shaft;
   (c) speed reducer means connected to receive power from said output shaft, said speed reducer means including axial lead screw means and follower means operable to move axially in one direction along said lead screw means in response to rotation of said output shaft in a clockwise direction and operable to move in the opposite direction along said lead screw means in response to rotation of said output shaft in a counter-clockwise direction;
   (d) lever means having a fulcrum pivotally mounted on said follower means;
   (e) first linkage means connected to said lever means on one side of said pivotal mount and adapted for connection to a vehicle accelerator pedal;
   (f) second linkage means connected to said lever means on the side of said pivotal mount opposite said first linkage means and adapted for connection to a vehicle engine throttle, wherein said motor means, upon receipt of an electrical control signal is operative to move the fulcrum of said lever means for varying the effective length of the linkage between said accelerator pedal and said vehicle engine throttle.

14. The servoactuator defined in claim 13, further comprising position sensing means disposed on said housing means and operative to sense the displacement of one of said first and second linkage means and provide an electrical feedback signal indicative thereof.

15. The servoactuator defined in claim 13, further comprising a linear potentiometer disposed on said housing means and operative for providing an electrical indication of the position of one of said first and second linkage means.

* * * * *